United States Patent [19]
Takeshima et al.

[11] Patent Number: 5,702,675
[45] Date of Patent: Dec. 30, 1997

[54] CATALYST FOR PURIFYING EXHAUST GASES AND PROCESS FOR PRODUCING THE SAME

[75] Inventors: Shinichi Takeshima, Susono; Toshiaki Tanaka, Numazu; Satoshi Iguchi, Mishima, all of Japan

[73] Assignee: Toyota Jidosha Kabushiki Kaisha, Japan

[21] Appl. No.: 571,638

[22] Filed: Dec. 13, 1995

[30] Foreign Application Priority Data

Dec. 16, 1994 [JP] Japan .................................. 6-313665

[51] Int. Cl.$^6$ .................................. B01D 53/92
[52] U.S. Cl. .................................. 423/213.5; 423/213.7
[58] Field of Search .................. 423/213.5, 213.7; 502/302, 303, 304

[56] References Cited

U.S. PATENT DOCUMENTS

| | | | |
|---|---|---|---|
| 4,868,148 | 9/1989 | Henk et al. | 423/213.5 |
| 5,019,546 | 5/1991 | Murakami et al. | 423/213.5 |
| 5,057,482 | 10/1991 | Wan et al. | 423/213.5 |
| 5,248,650 | 9/1993 | Sekiba et al. | 423/213.5 |
| 5,254,519 | 10/1993 | Wan et al. | 423/213.5 |
| 5,338,715 | 8/1994 | Iida et al. | 423/212 |
| 5,376,610 | 12/1994 | Takahata et al. | 423/213.7 |
| 5,575,983 | 11/1996 | Suzuki et al. | 423/213.5 |

FOREIGN PATENT DOCUMENTS

| | | | |
|---|---|---|---|
| 0 407 915 A3 | 1/1991 | European Pat. Off. | |
| 0 507 590 A1 | 10/1992 | European Pat. Off. | |
| 0 558 159 A3 | 9/1993 | European Pat. Off. | |
| 0 664 147 A2 | 7/1995 | European Pat. Off. | |
| 63-77544 | 4/1988 | Japan | 423/213.2 |
| 63-104651 | 5/1988 | Japan . | |
| 2-191548 | 7/1990 | Japan | 423/213.5 |
| 3-196841 | 8/1991 | Japan | 423/213.5 |
| 5-168860 | 7/1993 | Japan . | |
| 562516 | 9/1993 | Japan | 423/213.5 |
| 0 566 401 A1 | 10/1993 | Japan . | |
| 5-317652 | 12/1993 | Japan . | |
| 6-198135 | 7/1994 | Japan | 423/213.5 |
| WO95/00235 | 1/1995 | WIPO . | |

OTHER PUBLICATIONS

Derwent Abstracts Accession No. 86-004578/01, class E36, JP-A-60-232253 (Toyota Jidosha KK), published Nov. 18, 1985.

Derwent Abstracts Accession No. 87-126184/18, class Q51, JP-A-62-068545 (Toyota Jidosha KK), published Mar. 28, 1987.

Derwent Abstracts Accession No. 88-165593/24, class E36, JP-A-63-104651 (Nissan Motor KK), published May 10, 1986.

Derwent Abstracts Accession No. 91-181804/25, class E36, JP-A-109941 (Nippon Shokubai Kagaku), published May 9, 1991.

*Primary Examiner*—Gary P. Straub
*Assistant Examiner*—Peter DiMauro

[57] ABSTRACT

A catalyst for purifying exhaust gases, which is composed of a catalyst substrate, a first porous support layer supporting barium as a NOx-occluding material and palladium, which is formed on the catalyst support, and a second porous support layer supporting platinum, which is formed on the first porous support layer. Platinum efficiently oxidizes nitrogen monoxide to be converted into nitrogen dioxide. Palladium is supported in a highly dispersed state even after endurance to act as inlet and outlet of barium for nitrogen dioxide or the like, whereby absorption and emission of nitrogen oxides can be performed smoothly, and accordingly, the purification performance for nitrogen oxides is improved.

12 Claims, 1 Drawing Sheet

CATALYST FOR PURIFYING EXHAUST GASES AND PROCESS FOR PRODUCING THE SAME

BACKGROUND OF THE INVENTION

1. Field of the Invention

The present invention relates to catalysts for purifying exhaust gases discharged from internal combustion engines of motor vehicles or the like, and more particularly, to catalysts capable of efficiently reducing and purifying nitrogen oxides (NOx) in exhaust gases containing excess oxygen of an amount greater than that required for complete oxidation of reduction components in exhaust gases, such as carbon monoxide (CO), hydrogen ($H_2$) or hydrocarbon (HC).

2. Description of the Related Art

Conventionally, exhaust gases of motor vehicles or the like have been purified by oxidizing or reducing carbon monoxide, hydrocarbon and nitrogen oxides therein with three way catalysts. A well known example of the three way catalysts is composed of a heat-resistant substrate of cordierite or the like and a porous support layer of $\gamma$-alumina, which supports noble metals such as platinum, rhodium or the like. Another example of the three way catalysts further supports ceria (serium oxide) having oxygen-occluding ability to enhance the low temperature activation thereof.

Recently, in order to protect the surrounding environment, carbon dioxide ($CO_2$) in exhaust gases of internal combustion engines of motor vehicles or the like has been required to be reduced. As the system capable of meeting this requirement, "lean burn" system of burning fuel in the atmosphere containing excess oxygen has attracted much attention. With the lean burn system, the fuel economy is improved to decrease the fuel consumption, which results in the emission of carbon dioxide being restrained.

The conventional three way catalysts can oxidize or reduce carbon monoxide, hydrocarbon and nitrogen oxides to purify exhaust gases when the air-fuel mixture is in the stoichimetric air-fuel ratio, however, do not exhibit sufficient purification performance for nitrogen oxides in the atmosphere containing excess oxygen, which is generated in the lean burn system. Under these circumstances, the development of both a catalyst and a purifying system capable of efficiently purifying nitrogen oxides even in the atmosphere containing excess oxygen has been demanded.

The present inventors have proposed catalysts for purifying exhaust gases, which support alkali earth metals and platinum on a porous support of alumina or the like (Japanese Patent application laid-open No. Hei 5-317652), or lanthanum and platinum on a porous support (Japanese Patent application laid-open No. Hei 5-168860).

With these catalysts, when the air-fuel mixture is lean, nitrogen oxides are occluded in oxides of alkali earth metals and lanthanum (NOx-occluding material), and when the air-fuel mixture is stoichimetric or rich, the nitrogen oxides occluded react with reduction components such as hydrocarbon or carbon monoxide. Thus, even when the air-fuel mixture is lean, the purification performance is maintained good.

In order to occlude nitrogen oxides in alkali earth metals or lanthanum, nitrogen monoxide (NO) or the like must be oxidized to be converted into nitric acid ions. However, even when the air-fuel mixute is lean, the exhaust gases contain reduction components such as hydrogen, carbon monoxide or hydrocarbon. These components will obstruct the oxidation of nitrogen monoxide with the catalyst to block the occlusion of nitrogen oxides in a NOx-occluding material.

The catalyst activation depends on the kinds of noble metals. Platinum is especially good in the oxidation activation for nitrogen monoxide, and palladium is good in the oxidation activation for hydrocarbon and carbon monoxide. However, platinum is likely to be sintered, especially when the air-fuel mixture is lean, so that the inlet and outlet operations for nitrogen oxides to and from the NOx-occluding material may be damaged, which lowers the purification performance for nitrogen oxides after endurace. Palladium is not easily sintered when the air-fuel mixture is lean, but is likely to be affected by sulfur oxides (SOx), namely, sulfates attach to the surface of palladium to damage the activation thereof whereby the oxidation ability for nitrogen monoxide is inferior to that of platinum.

In order to improve the three way activation, platinum and palladium can be mixed together, but when they are supported adjacently, palladium may be concentrated on the surface of platinum in the oxidation atmosphere to damage the oxidation activation of platinum. This causes insufficient oxidation of nitrogen monoxide, resulting in nitrogen oxides being emitted without being occluded in the NOx-occluding material.

SUMMARY OF THE INVENTION

It is an object of the present invention to provide a catalyst for purifying exhaust gases, which is capable of efficiently reducing nitrogen oxides in exhaust gases with an arrangement that noble metals and a NOx-occluding material respectively achieve their operations sufficiently.

In a first aspect of the present invention, the catalyst for purifying exhaust gases includes a catalyst substrate, a first porous support layer supporting a NOx-occluding material selected from the group consisting of alkali metals, alkaline earth metals and rare earth elements, and palladium, which is formed on a surface of the catalyst substrate, and a second porous support layer supporting at least platinum, which is formed on a surface of the first porous support layer.

In a second aspect of the present invention, the first porous support layer of the catalyst of the first aspect of the present invention further includes components having oxygen-occluding ability.

(1) When the air-fuel mixture is lean:

With the catalyst of the first aspect, exhaust gases first contact the upper second porous support layer, and nitrogen monoxide or the like in exhaust gases is oxidized with the catalytic action of platinum in the presence of oxygen to be converted into nitrogen dioxide or the like. And the reduction components such as hydrogen, carbon monoxide and hydrocarbon in exhaust gases are also oxidized.

In the lower first porous support layer, nitrogen dioxide or the like reacts with water under the existance of the palladium, and they are oxidized to be converted into nitric acid ions. These ions are occluded by the NOx-occluding material in the vicinity of palladium. Thus, palladium does not serve to the oxidation of nitrogen monoxide, but acts as an inlet and an outlet of the NOx-occluding material for nitrogen dioxide or the like. Since nitrogen monoxide is oxidized by platinum of the upper porous support layer, which has a high oxidation activation, the conversion speed from nitrogen monoxide to nitrogen dioxide or the like is high so that the occlusion speed of the NOx-occluding material for nitrogen oxides also becomes high.

Due to oxidation of sulfur in fuel, palladium is normally affected by sulfur oxides, namely, sulfates attach to the surface of palladium to damage the activation thereof. With the catalyst of the present invention, nitrogen monoxide can be oxidized smoothly in the second porous support layer irrespective of the damage of palladium in the first porous support layer. Since palladium is not only readily affected by sulfur oxides but also readily releases sulfur oxides, palladium masks the NOx-occluding material in the vicinity thereof to prevent it from being affected by sulfur oxides. The exhaust gases reached the first porous support layer hardly contain the reduction components such as hydrogen, carbon monoxide and hydrocarbon, because the exhaust gases have first contacted the second porous support layer, whereby nitrogen oxides in exhaust gases are occluded by the NOx-occluding material more efficiently without being blocked by such components.

Since palladium does not exist in the vicinity of platinum, the concentration of palladium on the surface of platinum does not occur so that platinum continuously exhibits a high oxidation catalyst activation for nitrogen monoxide, and, even if platinum is sintered, the oxidation activation for nitrogen monoxide is hardly lowered. Since palladium is not easily sintered and maintains a highly dispersed state, it can sufficiently achieve the inlet and outlet operation of the NOx-occluding material for nitrogen dioxide or the like even at elevated temperatures, and since the NOx-occluding material is also in a highly dispersed state, it can occlude nitrogen oxides efficiently.

Where the first porous support layer includes components having oxygen-occluding ability, as shown in the second aspect of the present invention, the oxidation of residual hydrocarbon and carbon monoxide in exhaust gases is promoted so as to prevent the block of the conversion of nitrogen dioxide or the like into nitric acid ions due to hydrocarbon and carbon monoxide, and accordingly, the NOx-occluding material can occlude nitrogen oxides more efficiently.

(2) When the air-fuel mixture is in the stoichiometric air-fuel ratio or rich:

In the catalyst of the first aspect of the present invention, the highly dispersed NOx-occluding material of the first porous support layer emits nitrogen oxides. The emitted nitrogen oxides are reduced to some extent by palladium in the presence of the reduction components, and contacts the second porous support layer.

In the second porous support layer, nitrogen oxides are further reduced by platinum in the presence of the reduction components to be converted into nitrogen ($N_2$). Thus, nitrogen oxides are purified. If rhodium is supported as well as platinum, nitrogen oxides are reduced more efficiently with excellent reduction activation of rhodium, whereby the purification rate of nitrogen oxides is further increased.

If the first porous support layer has components having oxygen-occluding ability, as shown in the second aspect of the present invention, oxygen which has been occluded when the air-fuel mixture is lean is emitted to oxidize and eliminate hydrocarbon and carbon monoxide in the vicinity of palladium, whereby emission of nitrogen oxides from the NOx-occluding material is promoted. Furthermore, the reduction components in exhaust gases, such as hydrocarbon and carbon monoxide, which still remain after reduction of nitrogen oxides, are oxidized and purified, whereby the three way activation is enhanced. It is most preferable to use ceria having excellent heat resistance as the components having oxygen-occluding ability.

Furthermore, it is desirable not to include components having oxygen-occluding ability in the second porous support layer. If the second porous support layer contains ceria or the like, when the air-fuel mixture is rich, carbon monoxide and hydrocarbon are consumed in the second porous support layer so that the reduction of nitrogen oxides does not readily occur in the first porous support layer. In order to overcome this problem, the amount of hydrocarbon or the like must be increased to make the air-fuel mixture excessively rich, which lowers the fuel economy. Accordingly, by supporting ceria or the like merely on the first porous support layer, the reduction reaction of nitrogen oxides proceeds efficiently in the first porous support layer to enhance the purification performance for nitrogen oxides.

Other objects, features, and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
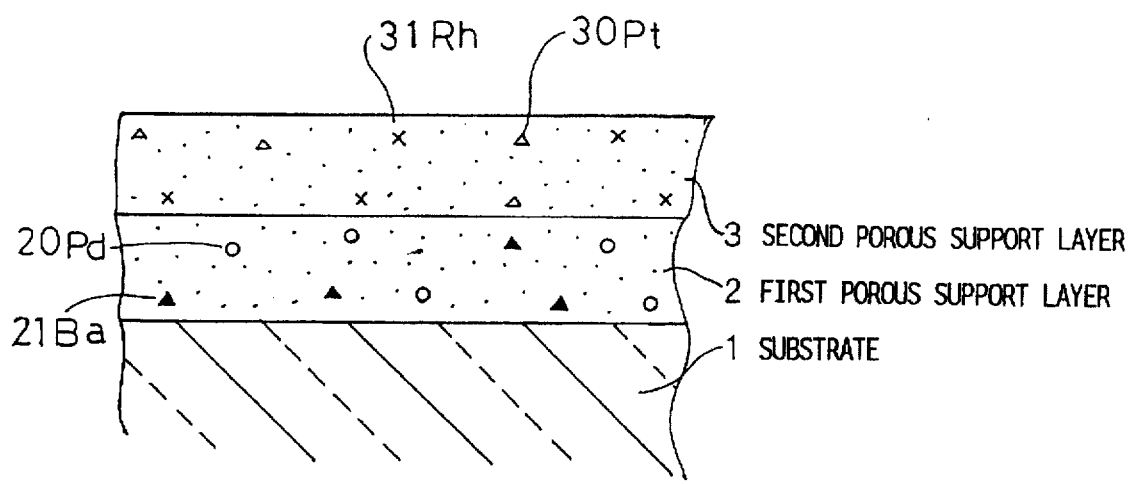
FIG. 1 is a diagram illustrating the arrangement of a first embodiment of a catalyst for purifying exhaust gases in accordance with the present invention.

The materials of the first and second porous support layers are not specifically limited, but selected from the group consisting of alumina, silica, silica-alumina, titania and the like. Alumina is especially preferable because of the excellent heat resistance and noble metals-dispersing property.

The preferred content of palladium which will be supported on the first porous support layer is 0.2 to 20 g per 100 g of the material of the first porous support layer, namely, 0.1 to 20 g per liter of the overall volume of the catalyst. The most preferred content thereof is 1 to 20 g per 100 g of the material of the first porous support layer, namely 0.5 to 10 g per liter of the overall volume of the catalyst.

The noble metals which will be supported on the second porous support layer include at least platinum, and can include one or more kinds of rhodium and palladium. In particular, it is preferable to include rhodium of the same amount as that of palladium mentioned above.

If the content of the noble metals is greater than the above range, the activation is not improved so that the noble metals cannot be effectively used. If the content of the novel metals is less than the above range, practically sufficient activation cannot be obtained.

In supporting the noble metals on the porous support layers, chlorides and nitrates thereof are supported by the conventional impregnation, spray or slurry-mixing method.

The NOx-occluding material in the first porous support layer is at least one kind of material selected from the group consisting of alkali metals, alkaline earth metals and rare earth elements. Examples of the alkali metals include lithium, sodium, potassium, rubidium, caesium, and francium. The alkaline earth metals denote the metals of Group 2A of the periodic table, and examples thereof include barium, beryllium, magnesium, calcium, and strontium. Examples of the rare earth elements include scandium, yttrium, lanthanum, cerium, praseodymium, and neodymium.

The preferred content of the NOx-occluding material ranges from 0.05 to 1.0 moles per 100 g of the material of the first porous support layer. If the content is less than 0.05 moles, the NOx-occluding ability decreases to lower the NOx-purification performance. If the content is greater than 1.0 mole, there occur defects such as saturation of NOx-occluding ability and increase of hydrocarbon emission.

Examples of the components having oxygen-occluding ability include iron, nickel, ceria and the like.

Hereinafter, ceria will be exemplified as the component exhibiting the best heat resistance. The preferred content of ceria ranges from 0.05 to 1.0 moles per 100 g of the material of the first porous support layer, namely, 0.025 to 0.5 moles per liter of the overall volume of the catalyst, and the most preferred content ranges from 0.1 to 0.5 moles per 100 g of the material of the first porous support layer, namely, 0.05 to 0.25 moles per liter of the overall volume of the catalyst. If the ceria content is greater than the above range, the resultant effect is saturated, and if it is less than the above range, the resultant effect is insufficient for practical use.

Examples of the catalyst substrate include a monolith type substrate, metal type substrate and pellet type substrate. Alternatively, the first porous support layer can serve as the catalyst substrate, too. The preferred thickness of the second porous support layer ranges from 10 to 100 µm. If the second porous support layer is thicker than the above range, the exhaust gases are difficult to reach the first porous support layer, and if the second porous support layer is thinner than the above range, the reaction in the second porous support layer is insufficient so as to be unpreferable. The preferred thickness of the first porous support layer which enables sufficient reaction therein is 10 µm or more.

EMBODIMENT 1

FIG. 1 is a cross-sectional view of one portion of a first embodiment of a catalyst for purifying exhaust gases. As shown, the catalyst is composed of a honeycomb substrate 1, a first porous support layer 2 formed on a surface of the substrate 1 and a second porous support layer 3 formed on a surface of the first porous support layer 2. The first porous support layer 2 supports palladium 20 and barium 21 as a NOx-occluding material, and the second porous support layer 3 supports platinum 30 and rhodium 31.

Hereinafter, the producing method of the catalyst will be explained.

(1) The formation of the first porous support layer 2:

100 parts by weight of alumina powder, 70 parts by weight of alumina sol (containing 10% by weight of alumina), 15 parts by weight of an aqueous solution containing 40% by weight of aluminum nitrate, and 30 parts by weight of water were mixed together, and stirred thoroughly to prepare a slurry.

A honeycomb substrate 1 formed of cordierite was immersed in water. After blowing off excess waterdrops, the substrate 1 was immersed in the prepared slurry. After removing the substrate 1 from the slurry, excess slurry was blown off. Then, the substrate 1 was dried at 80° C. for 20 minutes and calcinated at 600° C. for 1 hour to form an alumina coat layer on a surface of the substrate 1. The amount of the resultant alumina coat was 50 g per liter of the substrate 1.

Next, the honeycomb substrate thus obtained was immersed in an aqueous solution containing a predetermined amount of palladium nitrate. After removing the substrate from the aqueous solution, excess liquid drops were blown off and the substrate was dried at 250° C. to support palladium 20. Then, the honeycomb substrate was immersed in an aqueous solution containing a predetermined amount of barium acetate. After removing the substrate from the aqueous solution, excess liquid drops were blown off. Then, the substrate was dried at 250° C. and calcinated at 500° C. to support barium 21.

The first porous support layer 2 thus obtained supports 1 g of palladium and 0.3 g of metallic barium per 50 g of alumina (per liter of substrate).

(2) The formation of the second porous support later 3:

Alumina powder was impregnated with a predetermined amount of an aqueous solution containing a predetermined amount of dinitrodiamine platinum and rhodium chloride, and was dried and calcinated to support platinum and rhodium. The amount of platinum supported was 2 g per 100 parts by weight of alumina, and the amount of rhodium supported was 0.1 g per 100 parts by weight of alumina.

100 parts by weight of this Pt-Ph supporting alumina powder, 5 parts by weight of alumina sol (containing 10% by weight of alumina), 5 parts by weight of zirconia sol (containing 4% by weight of zirconia), and 50 parts by weight of water were mixed together to prepare a slurry of a proper viscosity.

The honeycomb substrate 1 on which the first porous support layer 2 had been formed was immersed in the prepared slurry. After removal of the substrate 1 from the slurry, excess slurry was blown off. Then, the substrate 1 was dried at 80° C. for 20 minutes and calcinated at 600° C. for 1 hour to form the second porous support layer 3 on the surface of the first porous support layer 2.

The amount of coat of the second porous support layer 3 was 50 g per liter of the honeycomb substrate 1. And 1 g of platinum 30 and 0.05 g of rhodium 31 are supported on 50 g of alumina of the second porous support layer 3.

In the present embodiment, alumina powder which had previously supported platinum and rhodium were used to form the second porous support layer. Instead, the second noble metals such as platinum and rhodium can be absorbed by and supported on an alumina coat layer. In this case, in order to prevent the first porous support layer from supporting the second noble metals, a buffer solution adpated to control the support speed may be decreased extremely to support platinum or the like on the second porous support layer immediately.

EMBODIMENT 2

(1) The formation of the first porous support layer:

100 parts by weight of alumina powder, 70 parts by weight of alumina sol (containing 10% by weight of alumina), 15 parts by weight of an aqueous solution containing 40% by weight of aluminum nitrate, 60 parts by weight of cerium oxide (ceria), and 30 parts by weight of water were mixed together and stirred thoroughly to prepare a slurry.

A honeycomb substrate formed of cordierite was immersed in water. After excess waterdrops were blown off, the substrate was immersed in the prepared slurry. After removing the substrate from the slurry, excess slurry was blown off. Then, the substrate was dried at 80° C. for 20 minutes and calcinated at 600° C. for 1 hour to form an alumina-ceria coat layer on the surface of the honeycomb substrate. The amount of the resultant coat was 50 g per liter of the honeycomb substrate.

Next, the honeycomb substrate thus obtained was immersed in an aqueous solution containing a predetermined amount of palladium nitrate. After removing the substrate from the aqueous solution, excess liquid drops were blown off. Then, the substrate was dried at 250° C. to support palladium. Then, the substrate was immersed in an aqueous solution containing a predetermined amount of barium acetate. After removing the substrate from the aqueous solution, excess liquid drops were blown off. Then, the substrate was dried at 250° C. and calcinated at 500° C. to support barium.

The first porous support layer thus obtained supports 0.1 moles of ceria, 1 g of palladium and 0.3 g of metallic barium per 50 g of alumina (per liter of substrate)

(2) The formation of the second porous support layer:

The second porous support layer was formed, similarly to the first embodiment. The amount of a resultant coat of the second porous support layer was 50 g per liter of the substrate. And 1 g of platinum 30 and 0.05 g of rhodium 31 were supported per 50 g of alumina of the second porous support layer 3.

COMPARATIVE EXAMPLE 1

100 parts by weight of alumina powder, 70 parts by weight of alumina sol (containing 10% by weight of alumina), 15 parts by weight of an aqueous solution containing 40% by weight of aluminum nitrate and 30 parts by weight of water were mixed together and stirred thoroughly to prepare a slurry.

A honeycomb substrate formed of cordierite was immersed in water. After excess waterdrops were blown off, the substrate was immersed in the prepared slurry. After removing the substrate from the slurry, excess slurry was blown off. Then, the substrate was dried at 80° C. for 20 minutes and calcinated at 600° C. for 1 hour to form an alumina coat layer on the surface of the honeycomb substrate. The amount of the resultant alumina coat was 100 g per liter of the honeycomb substrate.

Next, the honeycomb substrate thus obtained was immersed in an aqueous solution containing a predetermined amount of dinitrodiamine platinum. After removing the substrate from the aqueous solution, excess liquid drops were blown off, and the substrate was dried at 250° C. to support platinum. Then, the substrate was immersed in an aqueous solution containing a predetermined amount of rhodium chloride. After removing the substrate from the aqueous solution, excess liquid drops were blown off, and the substrate was dried at 250° C. to support rhodium. Next, the substrate was immersed in an aqueous solution containing a predetermined amount of barium acetate and lithium acetate. After removing the substrate from the aqueous solution, excess liquid drops were blown off. Then, the substrate was dried at 250° C. and calcinated at 500° C. to support barium and lithium.

The porous support layer thus obtained supports 2 g of platinum, 0.1 g of rhodium, 0.3 g of metallic barium and 0.1 g of metallic lithium per 100 g of alumina (per liter of substrate).

COMPARATIVE EXAMPLE 2

100 parts by weight of alumina powder, 70 parts by weight of alumina sol (containing 10% by weight of alumina), 15 parts by weight of an aqueous solution containing 40% by weight of aluminum nitrate, and 30 parts by weight of water were mixed together and stirred thoroughly to prepare a slurry.

A honeycomb substrate formed of cordierite was immersed in water. After excess waterdrops were blown off, the substrate was immersed in the prepared slurry. After removing the substrate from the slurry, excess slurry was blown off. Then, the substrate was dried at 80° C. for 20 minutes and calcinated at 600° C. for 1 hour to form an alumina coat layer on the surface of the honeycomb substrate. The amount of the resultant alumina coat was 100 g per liter of the honeycomb substrate.

Next, the honeycomb substrate thus obtained was immersed in an aqueous solution containing a predetermined amount of palladium nitrate. After removing the substrate from the aqueous solution, excess liquid drops were blown off, and the substrate was dried at 250° C. to support palladium. Then, the substrate thus dried was immersed in an aqueous solution containing a predetermined amount of barium acetate. After removing the substrate from the aqueous solution, excess liquid drops were blown off. Then, the substrate was dried at 250° C. and fired at 500° C. to support barium.

The porous support layer thus obtained supports 3 g of palladium and 0.3 g of metallic barium per 100 g of alumina (per liter of substrate).

COMPARATIVE EXAMPLE 3

100 parts by weight of alumina powder, 70 parts by weight of alumina sol (containing 10% by weight of alumina), 15 parts by weight of an aqueous solution containing 40% by weight of aluminum nitrate, 60 parts by weight of cerium oxide (ceria) powder and 30 parts by weight of water were mixed together and stirred thoroughly to prepare a slurry. A catalyst is formed by using the slurry thus prepared, similarly to the comparative example 1.

EXAMINATION AND EVALUATION

The catalysts of the embodiment 1 and the comparative examples 1 and 2 were respectively placed within reaction tubes formed of quartz glass, and the oxidation rate of nitrogen monoxide in the early stages was measured with a model gas a shown in TABLE 1. The inlet gas temperature was 300° C.

Next, the above catalysts were contacted with a model gas b at the inlet gas temperature of 400° C. for 5 hours to be affected by sulfur oxides. Then, the oxidation rate of nitrogen monoxide in each catalyst was measured, similarly to the above measurement. The results obtained are shown in FIG. 2.

TABLE 1

| | NO ppm | $H_2$ ppm | CO ppm | $C_3H_6$ ppm | $SO_2$ ppm | $O_2$ % | $CO_2$ % | $H_2O$ % | $N_2$ |
|---|---|---|---|---|---|---|---|---|---|
| gas a | 250 | 0 | 0 | 0 | 0 | 6 | 12 | 8 | bal. |
| gas b | 250 | 0 | 1000 | 1000 | 500 | 6 | 12 | 8 | bal. |
| gas c | 250 | 0 | 1000 | 2000 | 0 | 6 | 12 | 8 | bal. |

Figure 2:
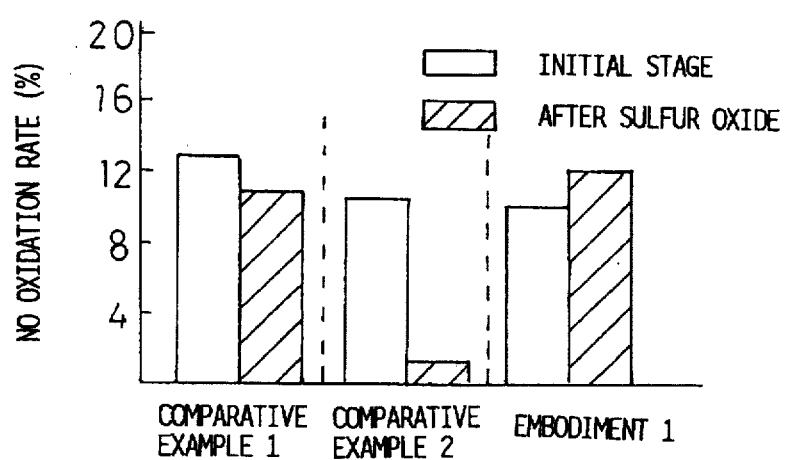
FIG. 2 is a graph showing the nitrogen monoxide oxidation rates of catalysts for purifying exhaust gases of an embodiment and comparative examples.

The results in FIG. 2 show that the oxidation rate of each of the comparative examples 1 and 2 decreased with the affection of sulfur oxides, and in particular, the oxidation rate of the comparative example 2 supporting palladium greatly decreased. In contrast, the oxidation rate of the embodiment 1 increased in spite of the support of palladium. This shows that the catalyst of the embodiment 1 was not affected by sulfur oxides.

Next, endurance tests of the catalysts of the embodiment 1 and comparative examples 1 and 2 were performed in pattern endurance at temperatures from 850° C. to 320° C.

The endurance times were two levels of 50 hours and 100 hours. After endurance, the amount of nitrogen monoxide occluded in each catalyst was measured by using a model gas c shown in TABLE 1 at an inlet gas temperature of 300° C. Results obtained are shown in TABLE 2.

TABLE 2

|  | first porous support layer | | | | | second porous support layer | | amount of NO occluded | |
| --- | --- | --- | --- | --- | --- | --- | --- | --- | --- |
|  | Pt | Rh | Pd | Ba | Li | Pt | Rh | 50h | 100h |
| Embodiment 1 | — | — | 3 | 0.3 | — | 1 | 0.05 | 225 | 146 |
| Comparative example 1 | 2 | 0.1 | — | 0.3 | 0.1 | — | — | 222 | 155 |
| Comparative example 2 | — | — | 3 | 0.3 | — | — | — | 135 | 37 |

From TABLE 2, it is clear that the amount of nitrogen monoxide occluded in the comparative example 2 was small, and, in contrast, the embodiment 1 occluded a large amount of nitrogen monoxide, which is substantially identical to the comparative example 1. This shows that the comparative example 2 does not exhibit good durability, but the embodiment 1 exhibits excellent durability substantially identical to that of the comparative example The relation between the amount of NO occluded and temperature was examined by the following method: The catalysts of the embodiment 1 and comparative example 1 were respectively placed within reaction tubes formed of quartz glass, and the amount of nitrogen monoxide occluded in each catalyst was measured by using a model gas c shown in TABLE 1. The inlet gas temperatures were 300° C. and 400° C. Results obtained are shown in TABLE 3.

TABLE 3

|  | Amount of NO occluded (mg) | |
| --- | --- | --- |
|  | 300° C. | 400° C. |
| Embodiment 1 | 146 | 145 |
| Comparative example 1 | 155 | 38 |

From TABLE 3, it is clear that the amount of nitrogen monoxide occluded in the comparative example 1 greatly decreased at 400° C., which shows that the comparative example 1 exhibits a large temperature-dependence. In contrast, the embodiment 1 hardly exhibit the temperature-dependence, and exhibits stable NO-occluding ability which is excellent at elevated temperatures.

Furthermore, the amount of nitrogen monoxide occluded in each of the embodiments 1 and 2 and the comparative examples 1 and 3 was examined by the following method: The catalysts were respectively placed within reaction tubes formed of quartz glass, and the amount of nitrogen monoxide occluded was measured by using the model gas c shown in TABLE 1.

The inlet gas temperature was 300° C. Results obtained are shown in TABLE 4.

TABLE 4

|  | first porous support layer | | | | | | second porous support layer | | amount of NO occluded (mg/piece) |
| --- | --- | --- | --- | --- | --- | --- | --- | --- | --- |
|  | Pt | Rh | Pd | Ba | Li | Ce | Pt | Rh |  |
| Embodiment 1 | — | — | 3 | 0.3 | — | — | 1 | 0.05 | 90 |
| Embodiment 2 | — | — | 3 | 0.3 | — | 0.1 | 1 | 0.05 | 146 |
| Comparative example 1 | 2 | 0.1 | — | 0.3 | 0.1 | — | — | — | 138 |
| Comparative example 3 | 2 | 0.1 | — | 0.3 | 0.1 | 0.1 | — | — | 155 |

The results in TABLE 4 show that the effect due to the addition of ceria was not observed in the catalysts of the comparative examples, but clearly observed in the catalysts of the present invention. From TABLE 4, it is clear that the oxidation and occlusion of nitrogen oxides are remarkably promoted due to the addition of ceria.

As described above, with the catalyst for purifying exhaust gases in accordance with the present invention, the window width for purification of nitrogen oxides is enlarged, and excellent durability in the purification performance for nitrogen oxides can be obtained, whereby nitrogen oxides can be purified stably over a long period of time.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A process for purifying carbon monoxide, hydrocarbons and nitrogen oxides in exhaust gases in oxygen-rich atmosphere, thereby purifying the exhaust gases, the process comprising:

bringing exhaust gases in oxygen-rich atmosphere, whose oxygen concentration is more than required for oxidizing the components to be oxidized therein, into contact with a catalyst:

the catalyst comprising:
a catalyst substrate;
a first porous support layer consisting essentially of first porous support supporting palladium and at least one kind of NOx-occluding material selected from the group consisting of alkali metals, alkaline earth metals and rare earth elements, and formed on a surface of said catalyst substrate; and
a second porous support layer comprising a second porous support supporting at least platinum, and formed on a surface of said first porous support layer, and wherein said second porous support layer supports no components having oxygen-occluding ability.

2. The process as claimed in claim 1, wherein said first porous support and second porous support are selected from the group consisting of alumina, silica, silica-alumina, and titania.

3. The process as claimed in claim 2, wherein said first porous support and second porous support are alumina.

4. The process as claimed in claim 1, wherein a content of said palladium is 0.2 to 40 g per 100 g of material of said first porous support layer.

5. The process as claimed in claim 1, wherein a content of said palladium is 1 to 20 g per 100 g of material of said first porous support layer.

6. The process as claimed in claim 1, wherein rhodium is further supported on said second porous support layer.

7. The process as claimed in claim 1, wherein a content of said NOx-occluding material is 0.05 to 1.0 moles per 100 g of material of said first porous support layer.

8. The process as claimed in claim 1, wherein a thickness of said second porous support layer is 10 to 100 μm.

9. A process for purifying carbon monoxide, hydrocarbons and nitrogen oxides in exhaust gases in oxygen-rich atmosphere, thereby purifying the exhaust gases, the process comprising:

bringing exhaust gases in oxygen-rich atmosphere, whose oxygen concentration is more than required for oxidizing the components to be oxidized therein, into contact with a catalyst:

the catalyst comprising:
a catalyst substrate;
a first porous support layer consisting essentially of a first porous support supporting palladium, at least one kind of NOx-occluding material selected from the group consisting of alkali metals, alkaline earth metals and rare earth elements, and at least one component having oxygen-occluding ability, wherein said first porous support layer is formed on a surface of said catalyst substrate; and a second porous support layer comprising a second porous support supporting at least platinum, wherein said second porous support layer is formed on a surface of said first porous support layer, and wherein said second porous support layer supports no components having oxygen-occluding ability.

10. The process as claimed in claim 9, wherein said component having oxygen-occluding ability in said first porous support layer is ceria.

11. The process as claimed in claim 10, wherein a content of said ceria is 0.05 to 1.0 moles per 100 g of material of said first porous support layer.

12. The process as claimed in claim 10, wherein a content of said ceria is 0.1 to 0.5 moles 100 g of material of said first porous support layer.

* * * * *

UNITED STATES PATENT AND TRADEMARK OFFICE
CERTIFICATE OF CORRECTION

PATENT NO.   : 5,702,675
DATED        : December 30, 1997
INVENTOR(S)  : Shinichi TAKESHIMA ET AL.

It is certified that error appears in the above-identified patent and that said Letters Patent is hereby corrected as shown below:

In claim 12 at column 12, line 22, after "moles", insert --per--.

Signed and Sealed this

Fourteenth Day of April, 1998

Attest:

BRUCE LEHMAN

*Attesting Officer*          *Commissioner of Patents and Trademarks*